United States Patent [19]

Wada et al.

[11] Patent Number: 5,585,043
[45] Date of Patent: Dec. 17, 1996

[54] METHOD OF COEXTRACTING NEPTUNIUM AND PLUTONIUM

[75] Inventors: Yukio Wada, Mito; Kyoichi Morimoto, Naka-gun; Takayuki Goibuchi, Katsuta; Hiroshi Tomiyasu, Yokohama, all of Japan

[73] Assignee: Doryokuro Kakunenryo Kaihatsu Jigyodan, Tokyo, Japan

[21] Appl. No.: 304,185

[22] Filed: Sep. 12, 1994

[30] Foreign Application Priority Data

Mar. 10, 1994 [JP] Japan .................................. 6-039550

[51] Int. Cl.$^6$ .................................................. C09K 11/04
[52] U.S. Cl. .......................... 252/636; 423/10; 204/157.4; 204/158.2; 976/DIG. 279
[58] Field of Search ............................. 423/10; 204/157.4, 204/158.2; 976/DIG. 279; 252/636

[56] References Cited

U.S. PATENT DOCUMENTS

| | | | |
|---|---|---|---|
| 2,874,025 | 2/1959 | Moore | 423/10 |
| 3,714,324 | 1/1973 | Weech | 23/341 |
| 3,962,401 | 6/1976 | Tsuboya et al. | 423/10 |
| 4,080,273 | 3/1978 | De Poorter et al. | 204/157.1 R |
| 4,131,527 | 12/1978 | Friedman et al. | 204/157.1 R |
| 4,659,551 | 4/1987 | Kolarik et al. | 423/10 |
| 4,774,026 | 9/1988 | Kitamori et al. | 252/627 |

OTHER PUBLICATIONS

Fukasawa, T. et al, "Partitioning of Neptunium from high level reprocessing solution with valence control", 1993, Proc. Int. Conf. Technol. Expo. Future Nucl. Sys, vol. 1, pp. 89–96.

Palei et al, Radiation Chemistry and Photochemistry, vol. 71, Abstract No. 76159v (1969).
Galkin et al, Radiation Chemistry and Photochemistry, vol. 103, Abstract No. 203603s (1985).
Fukasawa et al, Nuclear Technology, vol. 120, Abstract 146,806k (1994).
Nemodruk et al., Chemical Abstract, vol. 76, Abstract No. 119848s, 1972.
1993 Fall Meeting of the Atomic Energy Society of Japan, Oct. 9–11, 1993. No translation.
PNC Technical Review, No. 88, Dec. 1993, "Basic Study of Photochemical Valency Adjustment of Plutonium (Pu) and Neptunium (Np) in Nitric Acid Solution," pp. 40–53. No translation.

*Primary Examiner*—Ngoclan Mai
*Attorney, Agent, or Firm*—Oliff & Berridge

[57] ABSTRACT

In a method of coextracting neptunium and plutonium, a nitric acid solution containing a mixture of neptunium and plutonium is oxidized by irradiation of ultraviolet light. As a result, different valences of neptunium are adjusted all into the valence 6, which can remain in water, and in the meantime, valences of plutonium are adjusted into the valence 4 or 6, which can be extracted in the organic phase. It is therefore possible to coextract neptunium and plutonium without difficulty. The coextracted neptunium and plutonium can be used in forming mixed fuel by blending at least a portion of at least one of neptunium and plutonium which neptunium and plutonium have been formed by separating a nitric acid solution containing neptunium and plutonium by exposing the solution and a reducing agent to ultraviolet radiation to adjust the valences, and extracting the solution using an organic phase to extract plutonium from the solution into the organic phase.

13 Claims, 9 Drawing Sheets

METHOD OF COEXTRACTING NEPTUNIUM AND PLUTONIUM

BACKGROUND OF THE INVENTION

1. Field of the Invention

This invention relates to a method of coextracting neptunium and plutonium, and more particularly to a method of performing the coextraction by exposing a nitric acid solution containing neptunium and plutonium to ultraviolet radiation to control their valences.

2. Description of the Relates Art

In the reprocessing of spent nuclear fuels, high-radioactive waste produced in a nuclear reactor is removed after co-decontaminating and distributing processes. The distributing process is a process for separating uranium and plutonium from each other after extracted from the dilution solution of $HNO_3$ in the co-decontaminating process. The refining cycle is a process to remove contaminating FP elements from uranium and plutonium which are separated in the distributing process. The impurities in uranium are chiefly plutonium and neptunium. On the other hand, plutonium contains uranium and neptunium as main impurities. The refining cycle is a process for removing these impurities.

After distributing process, $Pu^{3+}$ in the aqueous phase is oxidized to $Pu^{4+}$ and this $Pu^{4+}$ is extracted in the organic phase, whereupon a dilute $HNO_3$ is added to the extracted $Pu^{4+}$ to reversely back-extract it into the aqueous phase, recovering plutonium. In this refining cycle, it has been customary to use nitrate (nitrogen dioxide $NO_2$ in particular) as an oxidizing agent, and hydroxylamine nitrate $NH_3OHNO_2$ (HAN) is used as a reducing agent. The oxidizing agent and the reducing agent as well as a stabilizing agent to be added as needed are selected since they will produce a small quantity of radioactive secondary waste.

However, in the case where nitrogen oxide is used as an oxidizing agent, although small amount of radioactive secondary waste substance would be produced, a large quantity of process waste fluid of oxidizing agent would be produced. Another problem with this case is that the TBP (tributylphosphate) solvent would be degraded.

This would be a problem not only in oxidizing Plutonium (Pu) but also in oxidizing neptunium (Np); for example, it would be a problem in converting Np(V), which is unable to be extracted in the organic phase, into Np(VI), which is able to be extracted in the organic phase.

In addition, for producing mixed nuclear fuel containing plutonium and neptunium, a method which can coextract them easily has been in keen demand in the art.

SUMMARY OF THE INVENTION

With the foregoing problems in view, it is an object of this invention to provide a coextracting method which enables easy coextraction of Pu and Np, with producing only a small quantity of process waste fluid and without degrading the TBP solvent.

In order to solve the foregoing problems, according to a first aspect of this invention, there is provided a method of coextracting neptunium and plutonium, comprising the steps of: exposing a nitric acid solution containing neptunium and plutonium to ultraviolet radiation to adjust valences; and extracting, after said exposing, the nitric acid solution using an organic phase containing tributylphosphate/n-dodecane to coextract neptunium and plutonium from the nitric acid solution into the organic phase.

According to a second aspect of the invention, the coextracting method is characterized in that said nitric acid solution is 1–10 normal of nitric acid solution.

According to a third aspect of the invention, the coextracting method is characterized in that said nitric acid solution is 2–4 normal of nitric acid solution.

According to a fourth aspect of the invention, the coextracting method is characterized in that said ultraviolet radiation has a wavelength equal to and less than 400 nm.

According to a fifth aspect of the invention, the coextracting method is characterized in that said ultraviolet radiation has a wavelength of 250–350 nm.

According to a sixth aspect of the invention, the coextracting method is characterized in that the source of said ultraviolet radiation is a mercury lamp.

According to a seventh aspect of the invention, the coextracting method is characterized in that said nitric acid solution contains a reagent which decomposes nitrous acid as a photo-decomposing composition.

According to an eighth aspect of the invention, the coextracting method is characterized in that said reagent is urea.

In the method of this invention, valence-5 neptunium and also valence-4 neptunium are oxidized into valence-6 neptunium by light irradiation while a part of plutonium is oxidized into valence-6 plutonium. In this case, the nitric acid concentration of the nitric acid solution is preferably 1–10 normal, more preferably 2–4 normal.

Since valence-6 neptunium and also valence-4 and valence-6 plutonium can be extracted in the organic phase, it is possible to coextract them in the organic phase. In this invention, since valence-6 neptunium and valence-4 and valence-6 plutonium can be produced easily by light irradiation under the above-mentioned conditions (i.e., the valences of neptunium and plutonium can be adjusted into the valence which is able to be extract in the organic phase), it is possible to coextract neptunium and plutonium in the organic phase.

The neptunium-plutonium mixture produced by this coextraction can be used as nuclear fuel.

DETAILED DESCRIPTION

Figure 1:
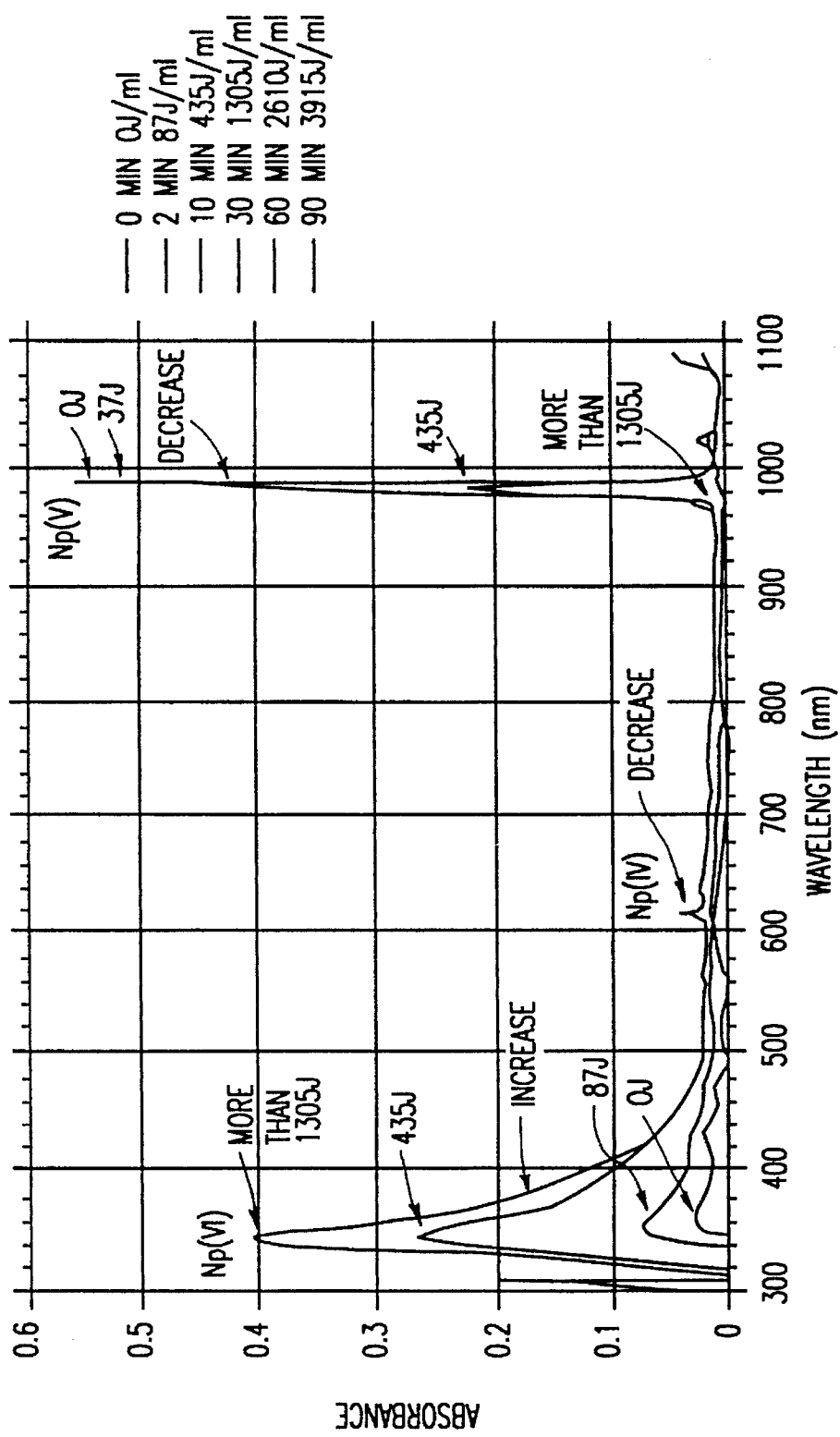
FIG. 1 is a graph showing the result of exposure test of a sample containing neptunium and urea.

In the valence adjusting by light irradiation, the following facts will be apparent from a test conducted under the direction of the present inventor(s).

(1) In a mixed nitric acid solution of Np and Pu containing a reducing agent of tenfold equivalent HAN and hydrazine:

1) Regarding the photochemical behavior of Pu, Pu(III) was oxidized into Pu(IV) and Pu(VI) by the irradiation of mercury lamp light radiation. Regarding the photooxidizing of Pu(III) into Pu(IV), the higher the irradiation rate and the nitric acid concentration, the more it was reactive. Regarding the photooxidizing of Pu(IV) to Pu(VI), the lower the nitric acid concentration, the more it was reactive. The quantum yield of photooxidization of Pu(III) into Pu(IV) was about 20%.

2) Regarding the photochemical behavior of Np, Np(V) was stable as it was neither oxidized nor reduced in the nitric acid solution as exposed to mercury lamp light (2) In a mixed 3N nitric acid solution of Np and Pu containing tenfold equivalent urea:

1) Regarding the photochemical behavior of Pu, a portion of Pu(IV) was oxidized into Pu(VI) by light irradiation.

2) Regarding the photochemical behavior of Np, at least 95% of Np(V) was oxidized into Np(VI) by light irradiation.

3) Regarding the photooxidization of Np(V) into Np(VI), the higher the nitric acid concentration, the more it was reactive.

(3) Regarding the results of analysis on principles of the photochemical reaction of the solution, the view point of principles of the photochemical reaction is identical with the electrochemical principles. More specifically, a standard electrode potential $E^0$ in a half-reaction of oxidization/reduction fluctuates largely as a solute molecular species absorbs light and is thereby excited. This fluctuations are interpreted as the change corresponding to light energy absorbed. In a pair of half-reactions in which a half-reaction does not progress, one oxidization-type or reduction-type ion species absorbs light and is thereby excited so that the electrode potential difference $DE^0$ will be equal to or more than an ordinary number eV. The equilibrium of this reaction will be a value equal to or more than $10^{20}$ in terms of K from the relationship between a thermodynamic variation of Gibbs free energy and a chemical equilibrium constant K. In other words, this reaction is tending largely toward the product, so it can be thought that oxidization or reduction will completely progress with the light-absorbed and excited ion species as a radical.

(4) Regarding the separation of Pu and Np, it can be judged that since the chemical equilibrium constant K is large, the valence of Pu can be conditioned into Pu(IV) by about 100% and the valence of Np can be conditioned into Np(V). It can be concluded that Pu and Np can be separated from each other by solvent extraction.

(5) In the coextraction of Pu and Np, after urea is added to a mixed nitric acid solution of Pu and Np, by mercury lamp light irradiation, Np(V) can be oxidized into Np(VI) by about 100% while the valences of Pu(IV) and Pu(VI) can coexist. Since all of these valences are tending to be extracted toward in the solvent during the solvent extraction, it can be concluded that coextraction of Pu and Np is possible.

Determining of Conditions

In the Absence of Reducing Agent

Figure 2:
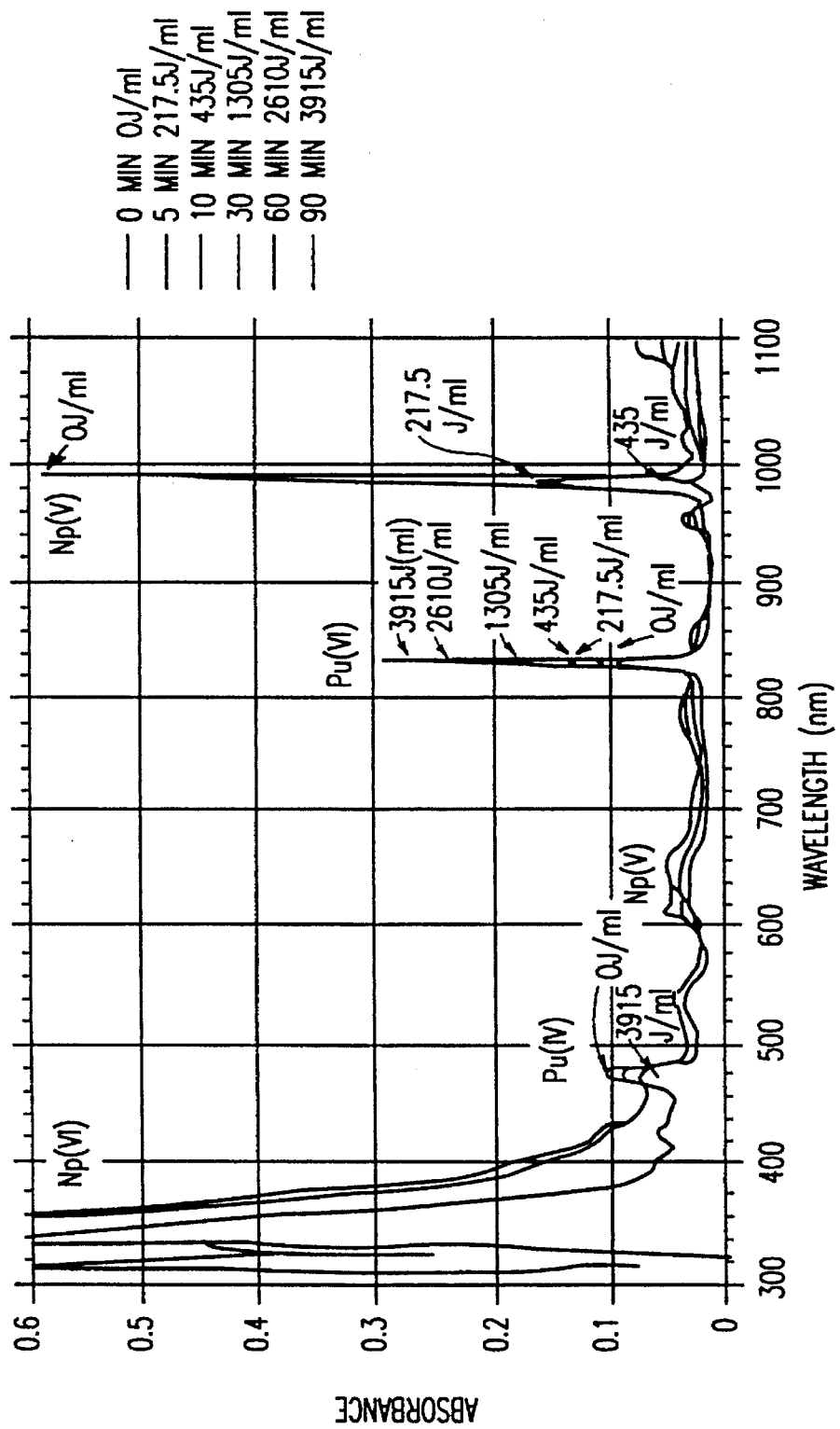
FIG. 2 is a graph showing the result of exposure test of a sample containing plutonium and neptunium under the same conditions as in FIG. 1.

FIGS. 1 and 2 show the fluctuations in oxidized state of neptunium as photooxidized (the results of test of light irradiation). More particularly, FIG. 1 shows the results of exposure text of a sample solution containing neptunium to light irradiation in the absence of a reducing agent, and FIG. 2 shows the results of exposure test of another sample solution containing a mixture of plutonium and neptunium in the absence of a reducing agent under the same conditions as in FIG. 1. In FIGS. 1 and 2, plutonium and neptunium were photooxidized in the absence of a reducing agent, and the quantity of them in different oxidation states were represented in terms of absorbed light quantity. The conditions in FIGS. 1 and 2 are: Np and Pu concentration were $1\times10^{-3}$M(=moles/l), nitric acid concentration was 3 normal, and temperature was 20° C. Further, in the full-wavelength light radiation of a mercury lamp, which was 250–600 nm, and the radiation rate was 0.05 W/cm². $8\times10^{-2}$M of urea was added to decompose nitrous acid produced as nitric acid was decomposed, but not to serve as a reducing agent. The nitric acid concentration was determined 3 normal partly because the oxidization of Np(V) is accelerated by the increase of nitric acid concentration and partly because 3 normal of nitric acid is optimal during the TBP/n-dodecane solvent extraction after valence adjusting.

As it is apparent from FIGS. 1 and 2, the quantity of valence-5 neptunium was decreased as exposed to light radiation. At the same time, the quantity of Pu(VI) was increased as a portion of valence-4 plutonium was further oxidized into the valence 6. Therefore, as photooxidization takes place under these conditions, both plutonium and neptunium can be adjusted at all to the valences which facilitate extracting them in the solvent.

In the Presence of Reducing Agent

Figure 3:
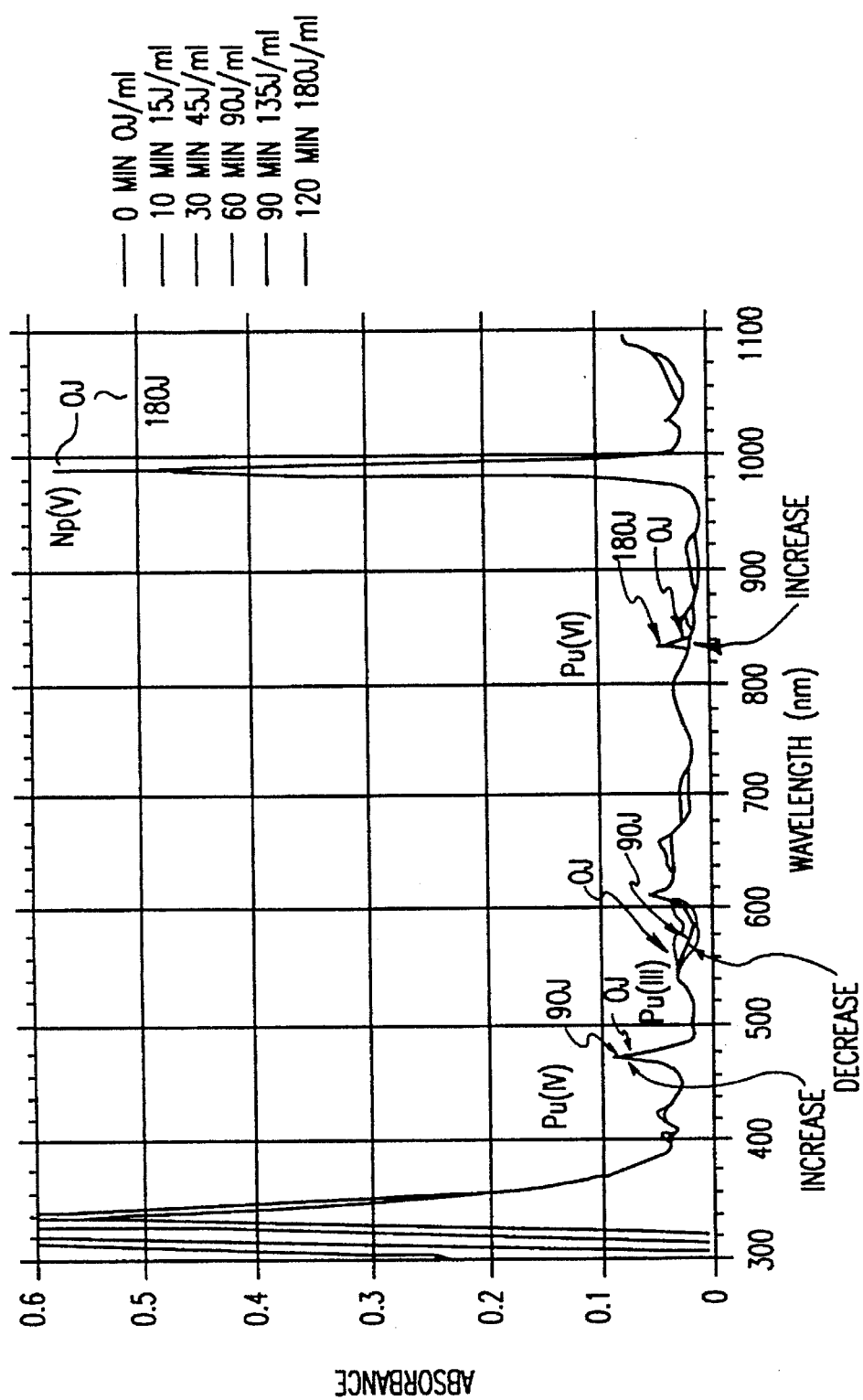
FIG. 3 is a graph showing the results of exposure test of a sample containing a reducing agent and a mixture of plutonium and neptunium.

In the case where a reducing agent exists in the nitric acid solution, the valences of plutonium and neptunium fluctuated as shown in FIG. 3. The conditions in FIG. 3 are identical with those of FIGS. 1 and 2 except that plutonium and a reducing agent coexist and that the radiation rate was low (0.05 W/cm²). In FIG. 3, the added reducing agent was hydrazine and HAN and the concentration of each was $1\times10^{-2}$M. In addition both the plutonium concentration and the neptunium concentration was $1\times10^{-3}$M.

As it is apparent from FIG. 3, the quantity of valence-5 neptunium was not reduced in the presence of the reducing agent. This is contrastive to the case of the samples (devoid of the reducing agent) of FIGS. 1 and 2 in which the quantity of valence-5 neptunium was decreased as exposed to light irradiation. Meanwhile, the quantity of both valence-4 plutonium and valence-6 plutonium was increased as the quantity of valence-3 plutonium was reduced.

Fluctuation of Plutonium

Figure 4:
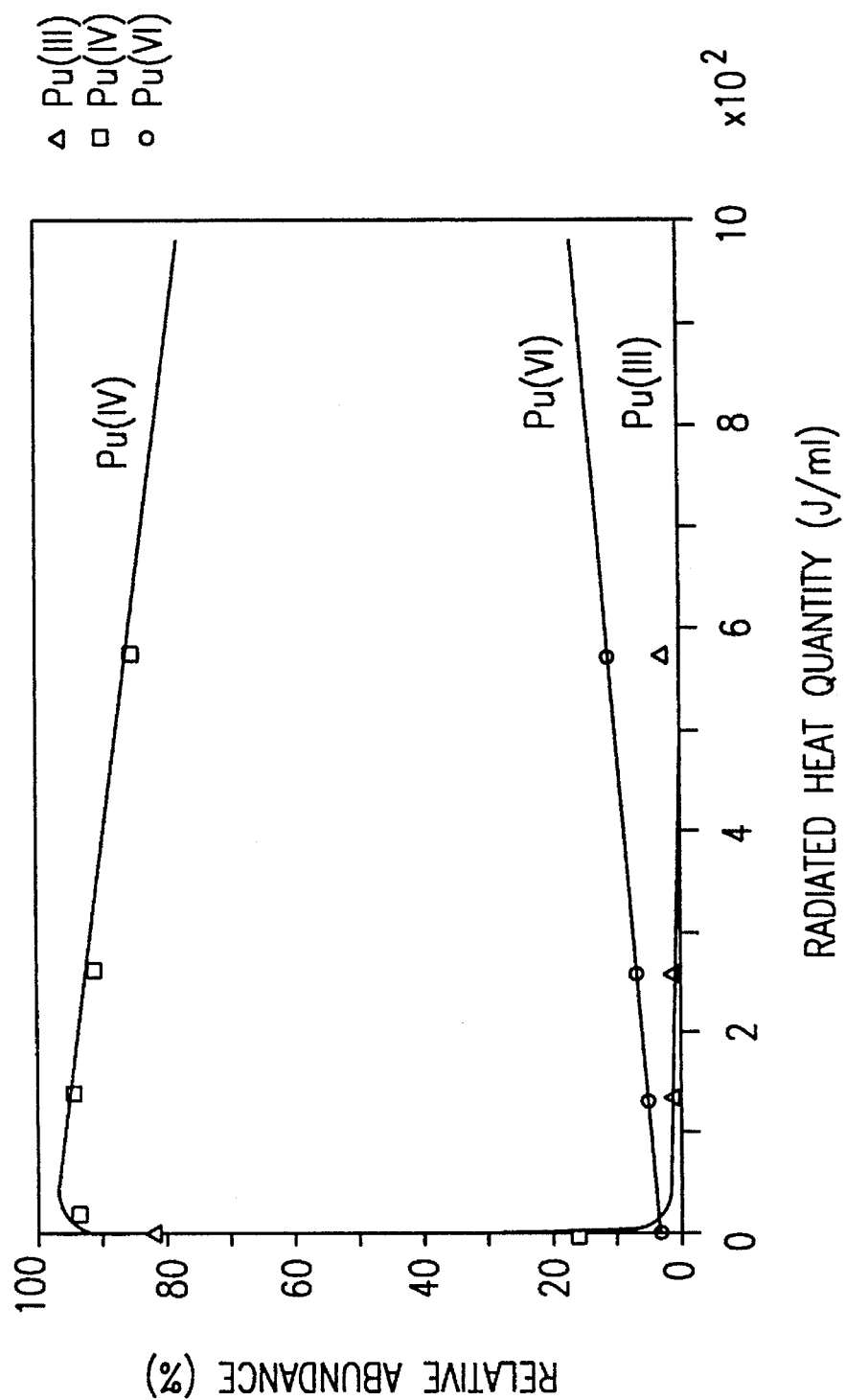
FIG. 4 is a graph showing the behavior of plutonium as light irradiation.

FIG. 4 shows the fluctuations of plutonium in the presence of a reducing agent. The conditions in FIG. 4 are the same as in FIG. 3 except that the plutonium concentration was $1\times10^{-2}$M and the radiation intensity was 0.15 W/cm². A double-equivalent amount of reducing agent was used. Instantly after light irradiation, valence-3 plutonium was reduced sharply while valence-4 plutonium was increased sharply. Therefore, for removing valence-3 plutonium, only a short-time light irradiation is needed so that plutonium can be extracted in the organic phase by the short-time irradiation. If the radiation time is increased, valence-4 plutonium will be decreased while valence-6 plutonium will be increased. Thus it is possible to extract both of them in the organic phase, irrespective of the presence of the reducing agent. The reaction rate of oxidization of valence-3 plutonium into valence-4 plutonium was increased in response to the rise of nitric acid concentration or the increase of radiation intensity. However, when irradiation rate was too great, the oxidization progressed too quickly and, as a result, an increased quantity of valence-6 plutonium was produced.

Valence-3 plutonium was decreased to a rate of existence of 5–6% as it was gradually oxidized without light irradiation. However, it takes a long time of about 100 minutes, so it is preferable that the oxidization should take place by light irradiation.

Plutonium and Neptunium

As it is apparent from the foregoing description, in the absence of a reducing agent, both plutonium and neptunium were extracted in the organic phase. On the other hand, in the presence of a reducing agent, plutonium and neptunium were separated from each other. In the latter case, neptunium remained in the aqueous phase while plutonium was extracted in the organic phase.

Figure 5:
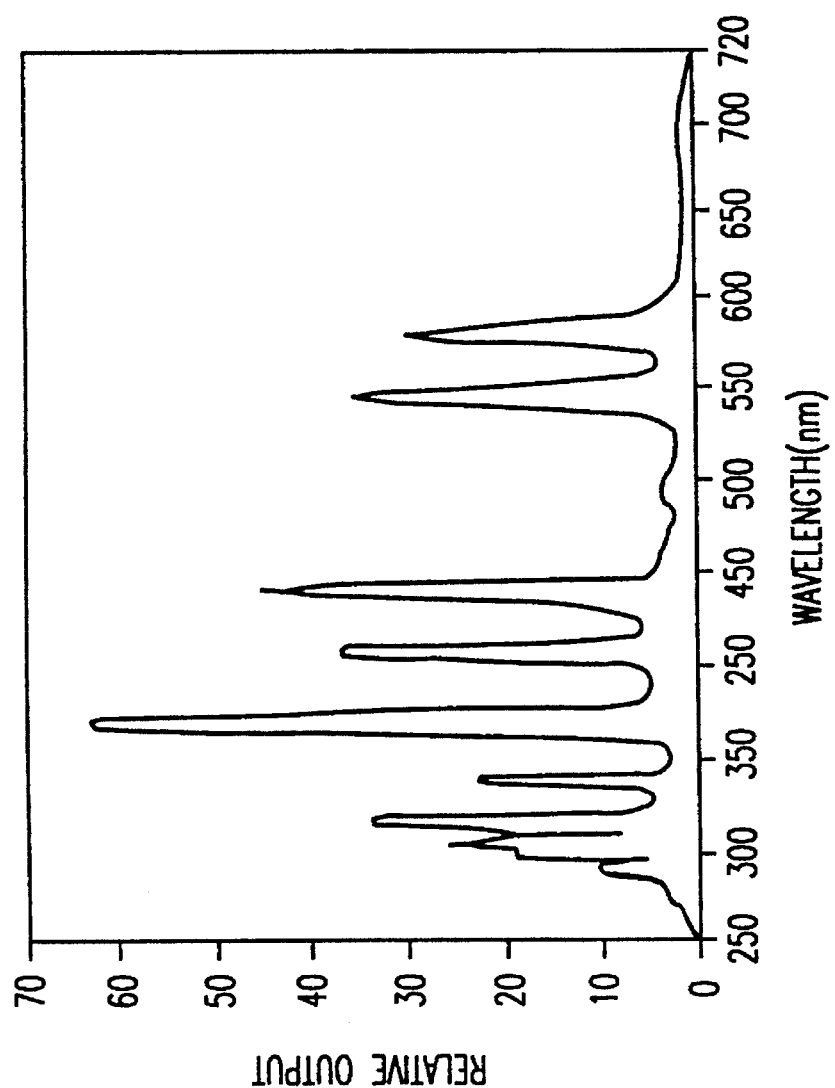
FIG. 5 is a graph showing a wavelength characteristic of a mercury lamp.

The wavelength characteristic of light of the mercury lamp used in this embodiment is shown in FIG. 5. Another test conducted under the direction of the present inventor(s) shows that a short-wavelength light irradiation of 400 nm or less was useful in photooxidization.

Photochemical Valence Adjusting Apparatus

Figure 6:
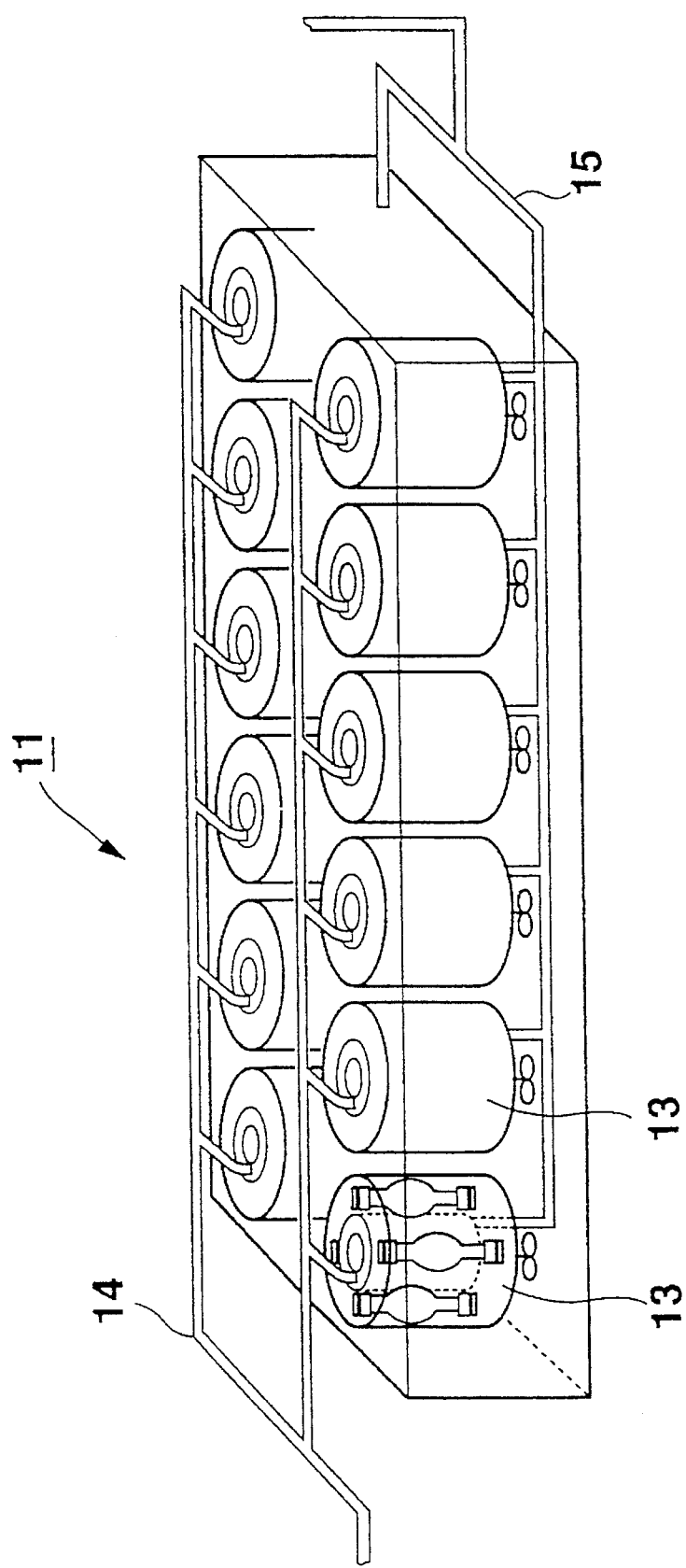
FIG. 6 is a schematic perspective view of a photochemical valence conditioning apparatus to be used in the method of in this invention.

FIG. 6 shows a photochemical valence adjusting apparatus to be used in the method of this invention. With this apparatus, it is possible to carry out the valence adjusting method of this invention.

As shown in FIG. 6, the photochemical valence adjusting apparatus 11 is composed of twelve photooxidizing units 13 arranged in rows and columns. A sample solution is supplied to the individual photooxidizing units 13 from a supply pipe 14, and the process fluid produced in the photooxidizing units 13 is discharged via a discharge pipe 15. The solution concentration, temperature, flow rate, etc. should be adjusted to meet the conditions described above in the "Determining of Conditions" portion.

Figure 7:
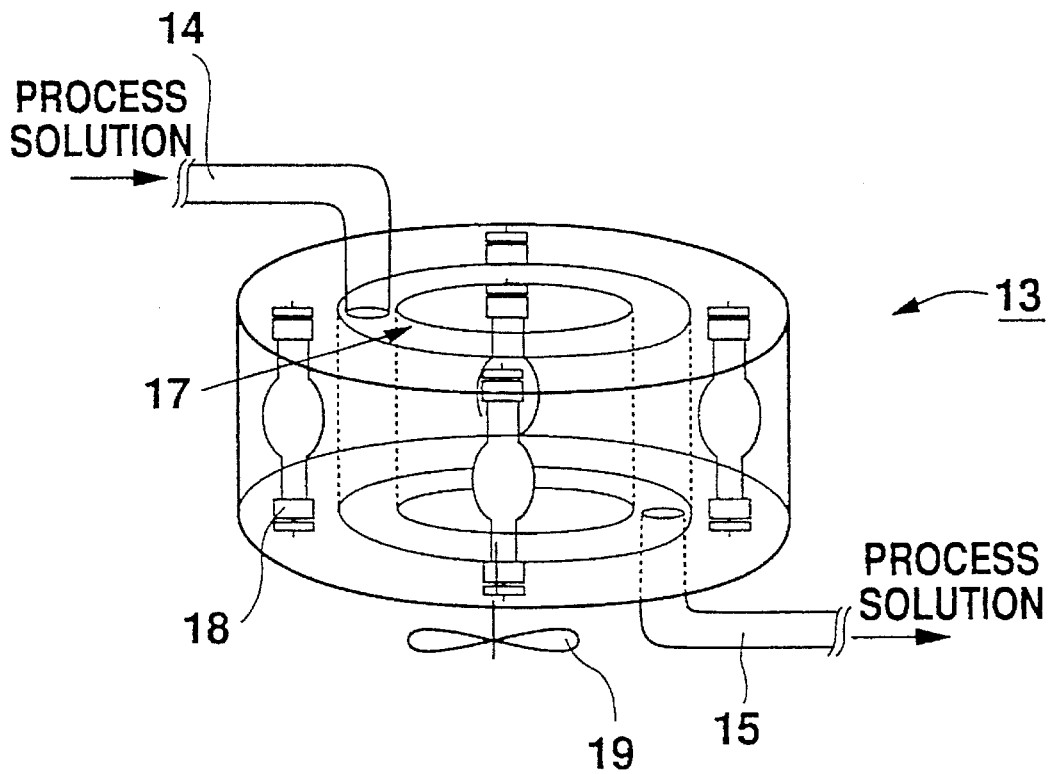
FIG. 7 is a schematic perspective view of a photooxidizing unit to be used in the photochemical valence conditioning apparatus.
Figure 8:
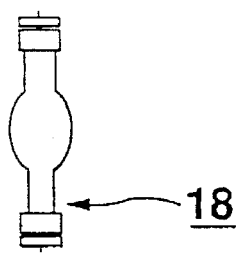
FIG. 8 is a schematic view of a mercury lamp to be used in the photooxidizing unit.

The structure of the photooxidizing unit 13 used in the photochemical valence adjusting apparatus 11 is shown in FIG. 7. As shown in FIG. 7, the photooxidizing unit 13 is equipped with a sample cell 17 in the form of a donut-shape glass cell for light irradiation. Inside and around the sample cell 17, a number of mercury lamps 18 (FIG. 8) are situated; four mercury lamps 18 are located around the sample cell 17 and single mercury lamp 18 is located centrally inside the mercury lamp 18, as shown in FIG. 7. All of the mercury lamps 18 are cooled by a cooling fan 19.

In the illustrated example, the inside diameter of the sample cell 17 is about 30 cm, the distance or width between inside and outside surfaces of the donut is 3 cm, and the height is about 10 cm. The mercury lamp is a 350 W lamp having the characteristic described above in the "Determining of Conditions" portion. In the photochemical valence conditioning apparatus 11 (FIG. 6) in which twelve photooxidizing units 13 are arranged, a capacity for oxidizing $1\times10^{-2}$ moles/l concentration of valence-3 plutonium into valence-4 plutonium may be determined to about 150 l/hr.

Separating Process

Figure 9:
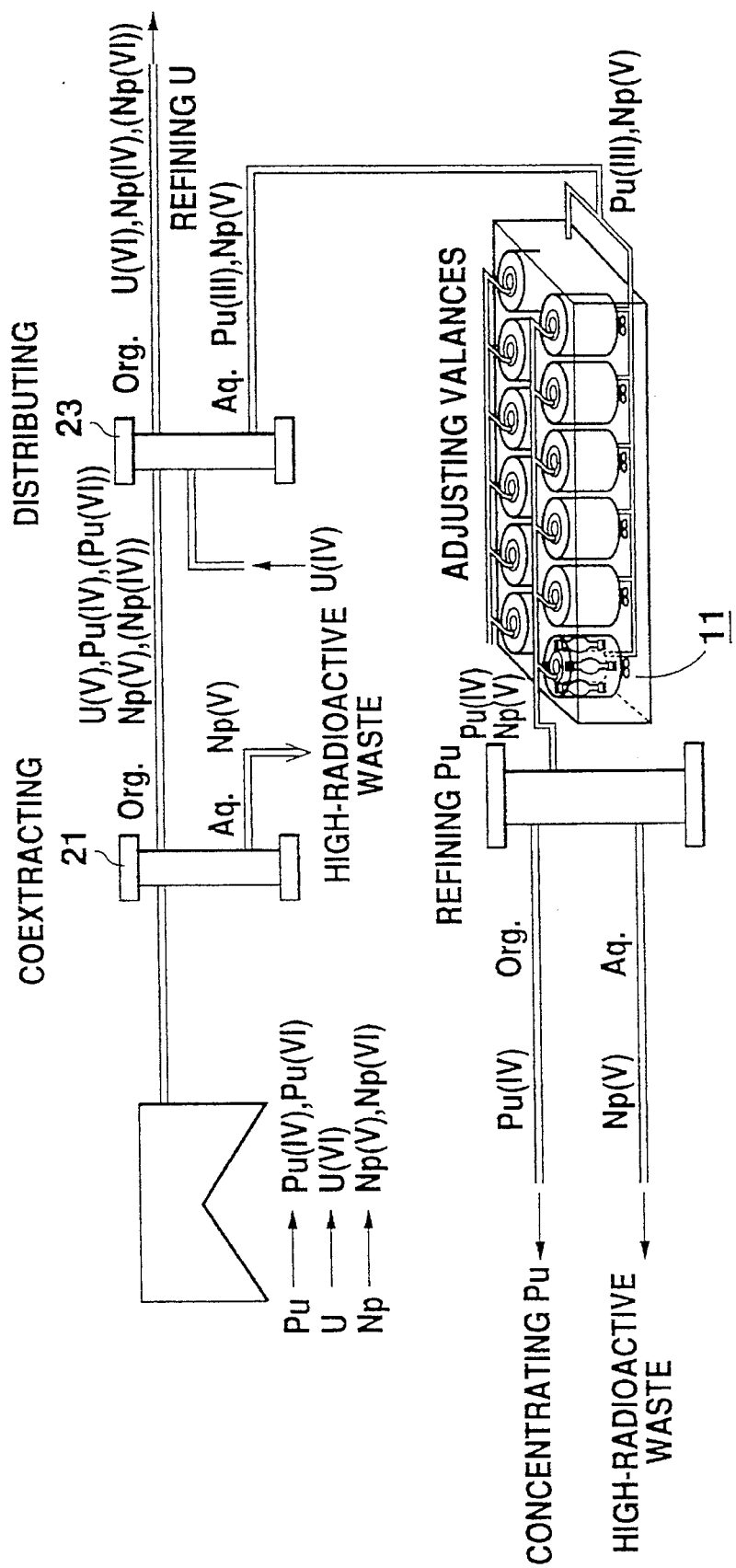
FIG. 9 is a schematic view of an entire processing system for carrying out the method of the invention.

FIG. 9 shows the operating of process the photochemical valence conditioning apparatus. In FIG. 9, in the co-decontaminating process 21, uranium and plutonium are removed from spent nuclear fuel produced in the nuclear reactor. At that time, both uranium and plutonium are extracted in the organic phase while a portion of valence-5 neptunium, remains in the aqueous phase as high-level waste (HLW). Meanwhile, the organic phase containing uranium and plutonium is forwarded to the next distributing process 23 where plutonium is reduced into the valence-3 by valence-4 uranium to reversely extract Pu(III) into the aqueous phase, thus separating uranium and plutonium from each other. Then, the organic phase containing uranium is forwarded to the uranium refining process where neptunium contained in the organic phase is separated to refine uranium.

Valence-5 neptunium also is contained in the aqueous phase containing valence-3 plutonium Pu(III). However, as already described, the aqueous phase is forwarded to the photochemical valence. At that time, with the neptunium retaining the current valence 5, the valence of plutonium is oxidized into 4. In this case, even if neptunium of different valences (4, 5, 6) exist, all the valences of neptunium are conditioned into 5. Meanwhile, valence-5 neptunium cannot be extracted in the organic phase and remains in the aqueous phase so that they can be separated by an ordinary extracting unit without difficulty.

Application

Figure 10:
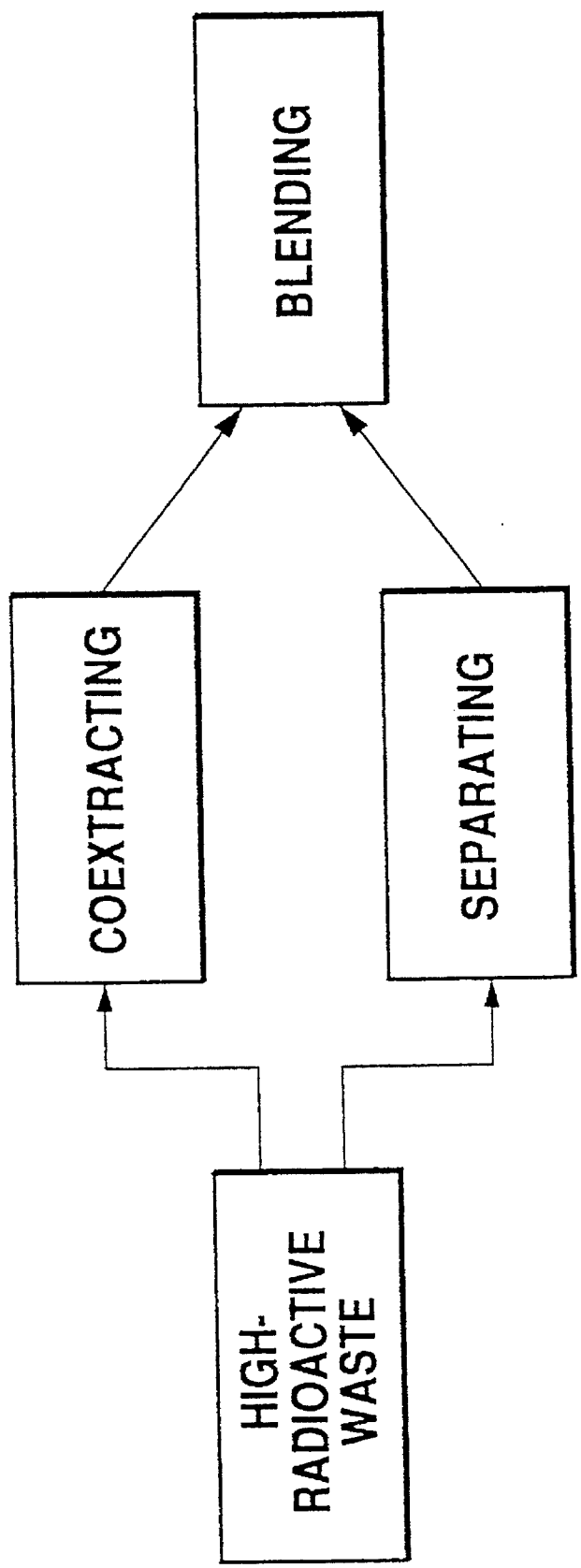
FIG. 10 is a flowchart showing the process for producing a mixed fuel of neptunium and plutonium.

If the solution does not contain a reducing agent, valence-5 is converted into valence-6 neptunium so that neptunium also can be extracted in the organic phase, as already described. Accordingly it is possible to coextract plutonium and neptunium. The mixing ratio of neptunium and plutonium in the coextracted solution is measured. By mixing a predetermined quantity of the individually separated plutonium or neptunium in the composition solution, it is possible to produce the composition solution having a desired concentration ratio. Assuming that the mixing ratio of neptunium and plutonium is known, this composition can be used readily as nuclear fuel (in order to be used as nuclear fuel, it must have an appropriate mixing ratio). By coextracting neptunium and plutonium and separating neptunium and plutonium individually in parallel with the coexisting and by blending them as desired, it is possible to produce the mixture having a desired concentration ratio (FIG. 10).

As it is mentioned in the foregoing description, according to this invention, it is possible to coextract neptunium and plutonium easily without producing secondary waste contaminated with radioactive substance. Since it is possible to obtain a nuclear fuel containing a mixture of neptunium and plutonium at a desired mixing ratio, this method is particularly useful for recycling of nuclear fuels.

Further, according to the method of this invention, it is possible to prevent degradation of TBP (tributylphosphate) to be used during extraction.

What is claimed is:

1. A method for producing mixed fuel containing plutonium and neptunium, comprising the steps of:

(a) coextracting neptunium and plutonium, by exposing a first nitric acid solution containing neptunium and plutonium to ultraviolet radiation to adjust valences, and then extracting the first nitric acid solution using an organic phase containing tributylphosphate/n-dodecane to coextract neptunium and plutonium from the first nitric acid solution into the organic phase;

(b) separating neptunium from plutonium, by exposing a second nitric acid solution containing neptunium, plutonium and a reducing agent to ultraviolet radiation to adjust valences, and then extracting the second nitric acid solution using an organic phase containing tributylphosphate/n-dodecane to extract plutonium from the second nitric acid solution into the organic phase;

(c) blending at least a portion of at least one of the separated neptunium and the separated plutonium from step (b) with the coextracted neptunium and plutonium from step (a).

2. A method according to claim 1, wherein said first nitric acid solution is 1–10 normal of nitric acid solution.

3. A method according to claim 2, wherein said first nitric acid solution is 2–4 normal of nitric acid solution.

4. A method according to claim 1, wherein said ultraviolet radiation has a wavelength equal to or less than 400 nm in the coextracting step.

5. A method according to claim 4, wherein said ultraviolet radiation has a wavelength of 250–350 nm in the coextracting step.

6. A method according to claim 1, wherein the source of said ultraviolet radiation in the coextracting step is a mercury lamp.

7. A method according to claim 1, wherein said first nitric acid solution contains a reagent which decomposes nitrous acid as a photo-decomposing composition.

8. A method according to claim 7, wherein said reagent is urea.

9. A method according to claim 1, wherein the reducing agent is hydroxylamine nitrate.

10. A method according to claim 1, wherein the reducing agent is hydrazine and hydroxylamine nitrate.

11. A method according to claim 1, wherein either at least a portion of the separated neptunium or at least a portion of the separated plutonium is blended with the coextracted neptunium and plutonium in step (c).

12. A method according to claim 11, wherein at least a portion of the separated neptunium is blended with the coextracted neptunium and plutonium.

13. A method according to claim 11, wherein at least a portion of the separated plutonium is blended with the coextracted neptunium and plutonium.

* * * * *